US010358038B1

(12) United States Patent
Ripley

(10) Patent No.: US 10,358,038 B1
(45) Date of Patent: *Jul. 23, 2019

(54) WIND TURBINE FOR ELECTRIC CAR

(71) Applicant: Peter W. Ripley, Hoodsport, WA (US)

(72) Inventor: Peter W. Ripley, Hoodsport, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,070

(22) Filed: Aug. 19, 2016

Related U.S. Application Data

(63) Continuation-in-part of application No. 13/506,733, filed on May 14, 2012, now Pat. No. 8,513,828, and a continuation-in-part of application No. 13/986,792, filed on Jun. 5, 2013, now Pat. No. 9,428,061.

(51) Int. Cl.
| | | |
|---|---|---|
| *F03D 9/00* | (2016.01) | |
| *B60K 16/00* | (2006.01) | |
| *B60L 8/00* | (2006.01) | |
| *B60L 11/18* | (2006.01) | |
| *F03D 9/32* | (2016.01) | |
| *F03D 3/00* | (2006.01) | |
| *F03D 3/04* | (2006.01) | |
| *F03D 3/06* | (2006.01) | |
| *H02K 7/18* | (2006.01) | |
| *H02J 7/14* | (2006.01) | |
| *F03D 9/25* | (2016.01) | |
| *H02K 53/00* | (2006.01) | |

(52) U.S. Cl.
CPC ............ *B60L 8/006* (2013.01); *B60K 16/00* (2013.01); *B60L 11/1809* (2013.01); *F03D 3/005* (2013.01); *F03D 3/0409* (2013.01); *F03D 3/062* (2013.01); *F03D 9/00* (2013.01); *F03D 9/002* (2013.01); *F03D 9/25* (2016.05); *F03D 9/32* (2016.05); *H02J 7/1415* (2013.01); *H02K 7/183* (2013.01); *H02K 53/00* (2013.01); *Y10S 415/916* (2013.01)

(58) Field of Classification Search
USPC ............................... 290/50, 44, 55; 180/2.2
See application file for complete search history.

(56) References Cited

U.S. PATENT DOCUMENTS

| | | | |
|---|---|---|---|
| 3,876,925 | A | 4/1975 | Stoeckert |
| 4,039,849 | A | 8/1977 | Mater et al. |
| 4,179,007 | A | 12/1979 | Howe |
| 4,423,368 | A | 12/1983 | Bussiere |
| 6,897,575 | B1 | 5/2005 | Yu |
| 7,135,786 | B1 | 11/2006 | Deets |
| 7,828,091 | B2 | 11/2010 | Wedderburn, Jr. et al. |
| 7,886,669 | B2 | 2/2011 | Kumar |
| 8,169,182 | B1 | 5/2012 | Kimble |

(Continued)

*Primary Examiner* — Vanessa Girardi

(57) ABSTRACT

A system for harnessing wind energy to charge the electric storage battery of a vehicle, whether the vehicle is parked or in motion. While the vehicle is being driven, a roof-mounted, internal wind turbine harnesses wind energy and causes rotation of the shaft of an electric generator mounted to an interior surface of the roof. For charging the battery while the vehicle is parked, an external wind turbine is storable in the vehicle when not in use and attaches to the internal wind turbine. Cups of the kind used in cup anemometers are attached to radial arms that extend from an external shaft of the external wind turbine and catch ambient wind currents while the vehicle is parked, causing the external shaft and the generator shaft to rotate.

13 Claims, 17 Drawing Sheets

(56) References Cited

U.S. PATENT DOCUMENTS

2011/0031043 A1 2/2011 Armani et al.
2011/0037261 A1* 2/2011 Champ .................. F03D 3/005
290/44
2011/0248666 A1 10/2011 Lorenson

* cited by examiner

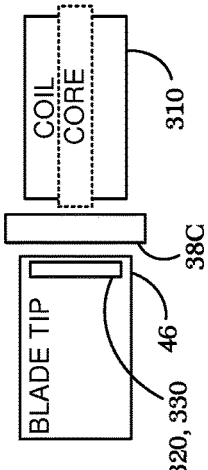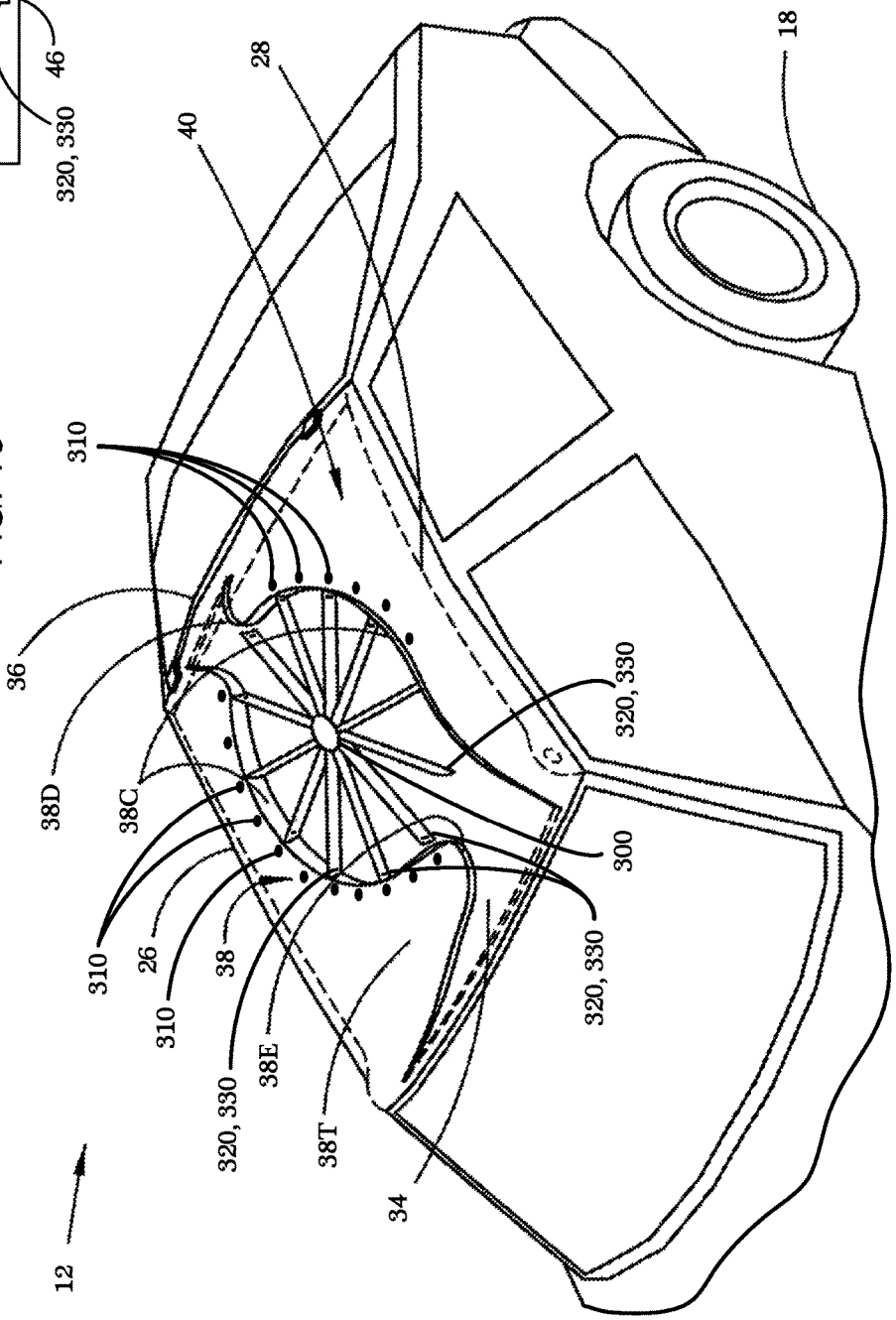
FIG. 16
FIG. 16A excellent# WIND TURBINE FOR ELECTRIC CAR

CROSS-REFERENCE TO RELATED PATENT APPLICATION

This application is a continuation in part of co-owned prior filed applications entitled "Wind Turbine for Electric Car" of Peter W. Ripley, the sole owner and inventor of application Ser. No. 13/506,733, filed 14 May 2012 and granted as U.S. Pat. No. 8,513,828, and Ser. No. 13/986,792, filed 5 Jun. 2013 and granted as U.S. Pat. No. 9,428,061, which are incorporated by reference herein in their entirety.

BACKGROUND OF THE INVENTION

Field of the Invention

This invention relates generally to devices for charging an electric battery of a motorized vehicle, and more particularly to devices for harnessing wind energy to charge an electric battery of an electric car.

Background Art

As used here, the term "electric car," "hybrid electric," "hybrid gas/electric," "all electric motor," and "all-electric vehicle" and "hybrid motor vehicle" refers to any motor vehicle that is powered substantially, in-part, and/or exclusively by an electric drive train. Hybrid motor vehicles with a drive train powered by an internal combustion engine in combination with one or more electric motors are now common on our streets and highways, but public acceptance of all-electric vehicles has been relatively slow. The slow acceptance of all-electric vehicles is largely due to the limited driving range such vehicles are currently capable of on a single charge of their electric storage batteries.

In addition, currently, there are relatively few places accessible to the public for recharging the batteries of an all-electric vehicle compared to the number of gasoline and diesel refueling stations. Further, the time required to recharge the batteries is significantly longer than the time required to fill the fuel tank of a vehicle that runs on gasoline or diesel fuel. Driving an all-electric vehicle beyond its rated driving range and to a location that lacks suitable battery charging facilities would likely mean incurring the time and expense for tow truck assistance before the driver could be underway again.

To address these challenges for electric and hybrid motor vehicles, and to promote public acceptance of battery-powered hybrid and all-electric cars and vehicles, it would be desirable to harness wind energy to help maintain some of the charge in the electric storage battery of all types of vehicles having one or more batteries, including for example hybrid gas/electric vehicles, electric cars, and all-electric vehicles, while the vehicle is being driven, as well as to charge the battery by harnessing wind energy while the vehicle is parked.

U.S. Pat. No. 7,886,669 B2 discloses a method for harnessing wind energy to charge a system battery that powered a limited number of electronic components of a stationary locomotive after engine shut down or while the locomotive coasts under gravity with its engine shut down. Those components can include lights and on-board monitoring and display systems of the locomotive.

This method also describes an electric device, such as a motor that could be run in an electrical generator mode. The motor can be coupled to an airflow device rotatable by ambient air flow. A controller is also included to activate the airflow device and generator when some minimum rotational speed of the airflow device occurs. For instance, the airflow device can be fan blades driven by the electric device to provide cooling. The airflow device can also harness ambient wind energy to drive the electric device to generate electricity for the electronic components or battery charging.

U.S. Pat. No. 7,828,091 B2 discloses an all-electric vehicle having an internal wind turbine generator mounted in the nose of the vehicle. The generator uses compressed air and a high voltage battery to generate electricity to power the DC motors that drove the vehicle. When available wind energy was inadequate, compressed air stored in one or more air tanks is required to drive an air motor coupled to an electric generator to generate electricity, which recharges the electric battery and/or powers the DC motors.

The devices known in this technical field have been limited for use to specialized electric vehicle applications, and have not been able to efficiently harvest wind energy for use with more commonly available electric vehicles, such as electric automobiles. For example, the device used with locomotives employs wind devices that are not suitable for use with electric automobiles because of the need to be integrated into existing blowers, or which must protrude outside the locomotive.

The wind turbine generator variant is designed to be mounted about a front end of what appears to be the electric motor of an automobile, and is not suited for efficient harvesting of wind energy passing around the vehicle. Either of these types of systems require a high level of technical expertise and knowledge of the host vehicle to incorporate, maintain, repair, and/or upgrade the electricity generation capability.

New methods and devices are needed to more efficiently harvest energy from an airstream to generate electricity for use with electric vehicles. Also needed are devices that are less complex, and which are not limited to use in specialized applications. What is needed are devices that can be adapted for use with a wider range of electric vehicles, especially consumer automotive vehicles. It would also be advantageous if wind energy harvesting methods and systems were available that are usable by users who may not have very advanced technical training and knowledge of how to install, maintain, and operate such methods and devices.

SUMMARY OF THE INVENTION

The present invention provides a system for charging an electric storage battery of an electric motor vehicle such as an automobile. In one configuration, the system efficiently harvests wind energy from the airstream moving across a vehicle roof during forward motion. In other arrangements, the system uses attachments to harvest wind energy when the vehicle is stationary. In all variations, the system is adapted to mount conformally about the roof of the vehicle without substantial alterations thereto.

Additionally, the system incorporates easily serviceable configurations enabling electric vehicle operators to maintain, upgrade, and operate the system without the need for a high level of technical knowledge, training, and expertise.

The charging system includes a first wind turbine internally arranged within a housing, which is mounted to the roof of the vehicle. The internal wind turbine is intended to provide electric current charge to the vehicle's electric storage battery while the vehicle is in motion.

The invention further includes a second, external wind turbine that also mounts to the internal first turbine assembly and/or the roof exterior. The second wind turbine enables electric current charge to the vehicle's electric storage battery while the vehicle is stationary or parked. The term "external" here signifies that the second, external wind turbine, is external to both the vehicle and the housing of the first internal wind turbine.

The internal wind turbine housing includes a bottom panel that extends across and attaches to the roof of the vehicle from a front end to an opposite rear end. The bottom panel is dimensioned and contoured to conformally overlie the vehicle roof, and includes a through hole that aligns with a hole in the vehicle roof. In other arrangements, the internal wind turbine may be mounted about the roof of the vehicle without the bottom panel, wherein the vehicle roof serves as the bottom panel.

The housing further includes an air inlet opening that overlies the front end of the bottom panel (or vehicle roof being used in place of the bottom panel), an air outlet opening that overlies the rear end of the bottom panel, and an air flow corridor attached to the bottom panel that extends between, and joins, the air inlet and outlet openings. The air flow corridor comprises an entryway portion in communication with the air inlet opening, a discharge portion in communication with the air outlet opening, and a central portion that communicates with the entryway and discharge portions.

The entryway portion is contoured to conduct air entering the inlet opening while the vehicle is in forward motion toward the central portion. The central portion is contoured to conduct air around the internal wind turbine. The discharge portion receives the air from the central portion and conducts or communicates the air to the air outlet opening.

The internal wind turbine further includes a turbine blade assembly disposed within the central portion of the air flow corridor. The turbine blade assembly includes a hub that extends axially along a turbine shaft axis from a first, lower end to a second, upper end thereof and is rotatable about the axis. A plurality of turbine blades are distributed about the periphery of the hub, extending radially away from the hub normal to the turbine shaft axis. Each turbine blade also preferably has a weighted blade tip.

During operation of the internal wind turbine, the weighted tips increase the angular moment of inertia of the wind turbine. The increased moment of inertia stabilizes or manages the angular momentum of the spinning internal wind turbine to counteract buffeting and turbulence resulting from changes in air moving through the turbine.

The internal wind turbine also includes electric generator means, which includes an electric generator; means for attaching the electric generator to an inside surface of the roof of the vehicle; and means for coupling the shaft of the electric generator to the hub of the turbine blade assembly. The first wind turbine further includes a lid that extends longitudinally from a front end to an opposite rear end thereof. The electric generator may be and or include one or more or at least one generator, alternator, dynamo, and or magneto, which may be used alone and in any combination.

The front end of the lid is pivotally attached to a front portion of the housing such that the lid is pivotable between a lowered, housing-covering position and a raised, open position. In its lowered position, the lid, in combination with the corridor, bottom panel and seal means, forms a closed compartment surrounding the turbine blade assembly, except for the air inlet and air outlet openings.

The internal wind turbine further includes locking means attachable to a rear end of the lid and to a rear portion of the vehicle for alternately securing the lid in a lowered, closed position and releasing the lid to a raised position. The turbine blade assembly may be removed from the housing to replace damaged blades, to clean the housing, and to remove, replace, service, and upgrade any of the electric generator components, including the one or more alternator, dynamo, and or magneto.

To facilitate removal of the turbine blade assembly from the housing, the means for coupling the shaft of the electric generator to the hub of the turbine blade assembly preferably includes an adaptor with radially-directed splines that attaches to the shaft of the electric generator shaft by set screws. A hub shaft is included that extends axially though the hub and has a lower recess shaped and dimensioned to receive the adaptor splines in mating engagement. A removable pin inserts through aligned apertures in the hub and the hub shaft coupling them so they rotate together.

The blades preferably attach to the hub by threaded fasteners. This arrangement enables replacement of damaged blades. Blades are more easily replaced once the assembly has been removed from the splined adaptor and the vehicle.

The invention further includes an external wind turbine. The external wind turbine also enables harvesting wind energy, converting it into electrical current to charge the battery of the vehicle while the vehicle is stationary and/or parked. To enable installation of the second wind turbine, the lid has an opening where the turbine shaft axis (A-A) passes through the lid.

The housing incorporates a means to seal against moisture and air leaks. The seal means may include a disk-shaped, hub grommet disposed above and covering an upper portion of the hub. The grommet has an upstanding neck that extends up through the opening in the lid. A washer is mounted on the neck adjacent to an upper surface of the lid, and a cap seal mounts on the neck over the washer.

The external wind turbine includes an external shaft that extends from an upper end to an opposite, lower end along an external shaft axis, which shaft is rotatable about the axis. The external shaft is "external" when installed in an operating mode on the parked vehicle. When so installed, the shaft extends upward and externally from the housing to have only a lower end portion of the shaft extending into and internally within the housing. The external wind turbine further includes a plurality of radially or outwardly directed arms circumferentially spaced apart around the external shaft, wherein each arm has an inner end attached to the shaft and an opposite, outer end.

For "catching" the movements of ambient wind, a turbine element such as a blade or anemometer type cup is attached to the outer end of each arm. Each turbine element or blade or cup has a concave inner surface and a convex outer surface that have a common peripheral edge defining the opening of the cup. The opening of each cup is generally orthogonal to and directed substantially along a tangent to the rotational path of the cups moving with the arms about the external shaft axis. The cups are positioned in an orientation to rotate about the external shaft axis and define a circular path during rotation.

The number of arms and cups is variable, but well-known in the art is a three armed variation, wherein each cup and respective arm are spaced apart at 120° intervals about the shaft axis. Thus, the external wind turbine resembles a cup anemometer in appearance and mechanical function.

The invention further includes means to couple the lower end of the external shaft to the hub for co-rotation therewith while maintaining the external shaft in coaxial alignment with the turbine shaft axis. In a first embodiment, the means to couple the external shaft to the hub is accomplished as follows. An upper end portion of the hub shaft has a cylindrical, upper recess that extends downward along the turbine shaft axis from the upper end of the hub shaft to a bottom end of the lower recess of the hub shaft.

The upper recess is defined by an upper recess wall that is dimensioned to receive in surrounding engagement a lower end portion of the external shaft. The upper recess wall has a pair of grooved pathways or keyways disposed at diametrically opposite locations on the recess wall. Each pathway or keyway includes, sequentially, a first leg that extends from the upper end of the hub shaft toward the bottom end of the recess. A second leg is included and extends through a circumferential arc normal to the turbine shaft axis. Also included is a third leg extending in reverse and part way back toward the upper end of the hub shaft 70, thereby forming a blind end of the pathway.

A pair of oppositely-disposed, oppositely-directed or extending ears or keys are attached to, and extend away from the lower end portion of the external shaft, which ears or keys are shaped and dimensioned to be received in sliding engagement within the grooved pathways or keyways. A disk-shaped buffer plate is disposed within the upper recess intermediate and between the bottom end and the grooved pathways thereof.

The buffer plate is dimensioned for sliding engagement with an inner surface of the upper recess wall and along the turbine shaft axis. A spring is disposed between and intermediate to the bottom wall of the upper recess and the buffer plate. The spring urges the buffer plate away from the bottom end of the recess and toward the grooved pathways.

To install the external wind turbine on a parked, all-electric, or hybrid electric vehicle, it will be used with the internal wind turbine remaining in place mounted on the roof exterior and with the lid lowered and locked. A lower end of the external shaft of the external wind turbine is inserted down through the opening of the lid, and aligned to be coaxial with the internal wind turbine shaft axis. During installation, the ears or keys of the external wind turbine are aligned with the first legs of the grooves or keyways.

The external wind turbine shaft is pressed downward against the buffer plate as the keys or ears slide down through the first legs of the keyways or grooves, thereby compressing the spring. The external shaft is then partially rotated about the turbine shaft axis to twist and move the ears into and through the second legs of the grooves. Next, the external shaft is partially retracted so that the ears or keys slide up the third legs, to lodge the keys or ears within the blind ends of the grooves or keyways. To dismount the external wind turbine from the vehicle, this process is reversed.

In a second, alternative embodiment of the invention, the coupling of the external wind turbine shaft to the hub of the internal wind turbine is accomplished as follows. An upper end portion of the hub shaft of the internal wind turbine is formed with an upper recess extending downward along the internal wind turbine shaft axis, between (10 the upper end of the hub shaft and (2) a bottom end of the recess. The upper recess is defined by the upper recess wall, which is shaped and dimensioned so that it can receive and surroundingly engage the lower end portion of the external shaft.

One or more ball-and-spring assemblies are attached to an inner surface of the recess within an alcove thereof. Each ball-and-spring assembly comprises a spring having a first end attached to the upper recess wall and a second, opposite end to which is attached a ball, such that the ball is movable between an extended, recess-occluding position and a retracted, non-occluding position within the alcove.

The lower end portion of the external shaft has at least one beveled indent that is shaped and dimensioned to receive in sliding engagement the ball of the ball-and-spring assembly, thereby causing, as the external shaft is moved into the upper recess, the following sequence of events: sliding engagement with the balls, progressive compression of the springs, retraction of the balls into the respective alcoves, and then capture of the balls within the beveled indent of the external shaft. Accordingly, downward movement of a lower end of the external shaft along the turbine shaft axis will seat the external shaft for co-rotation with the hub. Conversely, a forceful yank upwards on the external shaft de-couples the shaft from the upper recess to enable removal of the external wind turbine from the vehicle when not needed, and for storage.

BRIEF DESCRIPTION OF THE DRAWINGS

FIG. 16 is an enlarged perspective view of the wind turbine system of FIG. 2, with various additional components of the system depicted for illustration purposes; and FIG. 16A is an enlarged view with certain structure removed, of the wind turbine system of FIG. 16, with certain components schematically illustrated.

DETAILED DESCRIPTION

Figure 1:
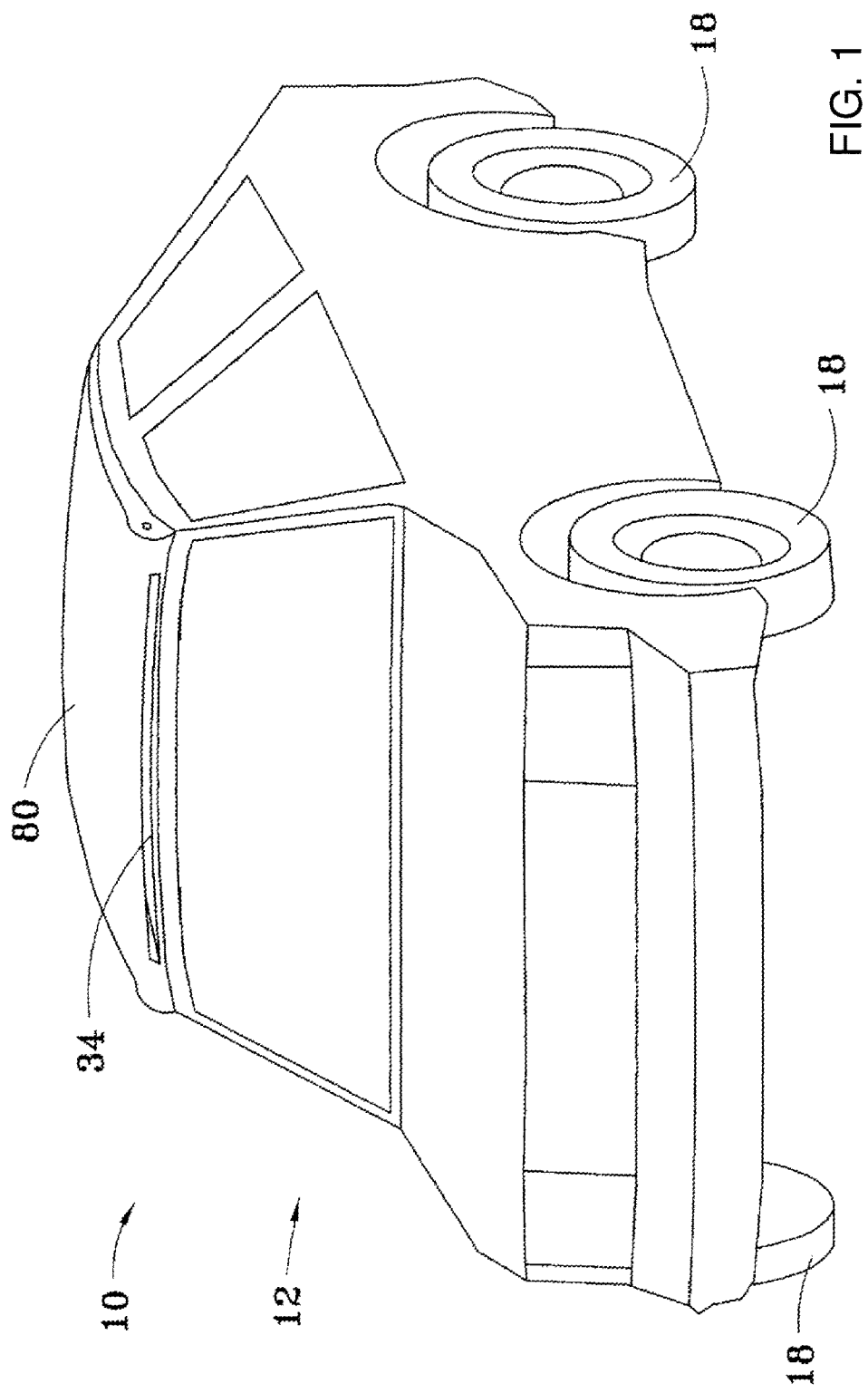
FIG. 1 is a front, perspective view of an electric vehicle such as an all-electric motor vehicle equipped with a roof mounted wind turbine system configured for charging the electric storage battery of the vehicle from a wind stream moving about the roof while the vehicle is in motion and/or when still at times when wind blows.

Referring now to FIGS. 1, 2, 3, and 4, the internal wind turbine 10 of the present invention is shown mounted to the roof 14 of an all-electric or hybrid motor vehicle 12. The motor vehicle depicted is a 2-door sedan, but the invention can be installed on the roof of other types of motor vehicles, such as hybrid and all-electric 4-door sedans, roadsters, vans, pickup trucks, utility vehicles, and other types of vehicles. A wind turbine is contemplated that is installed either as original equipment by the vehicle manufacturer, or as an after-market addition, or as a combination thereof.

Although not depicted in the drawings, it will be understood that the vehicle 12 is equipped with one or more electric storage batteries that provide electric power to various components of the vehicle, including one or more drive motors that are in driving engagement with the wheels 18 of the vehicle when the vehicle is being driven.

Figure 6:
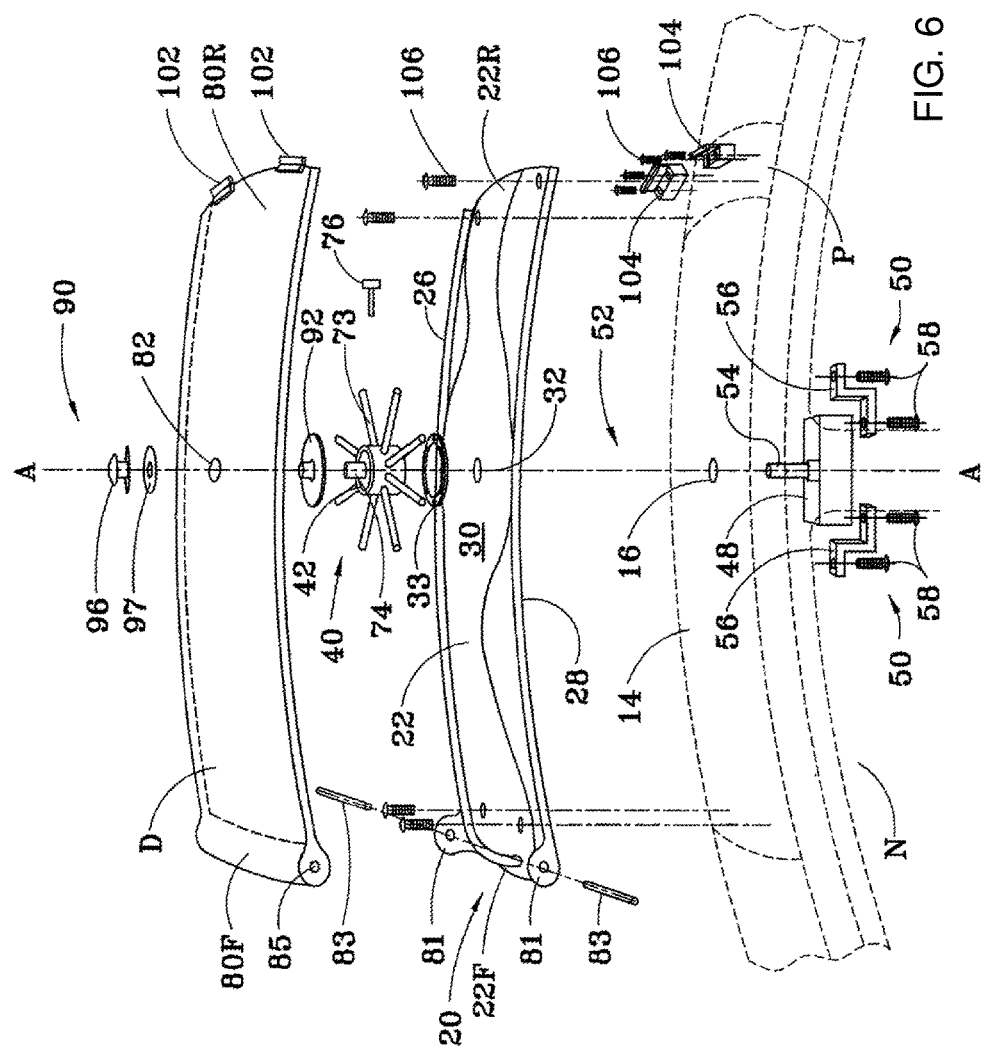
FIG. 6 is an enlarged, exploded, perspective side view of the system of the preceding figures, showing an internal wind turbine assembly of the system.
Figure 12:
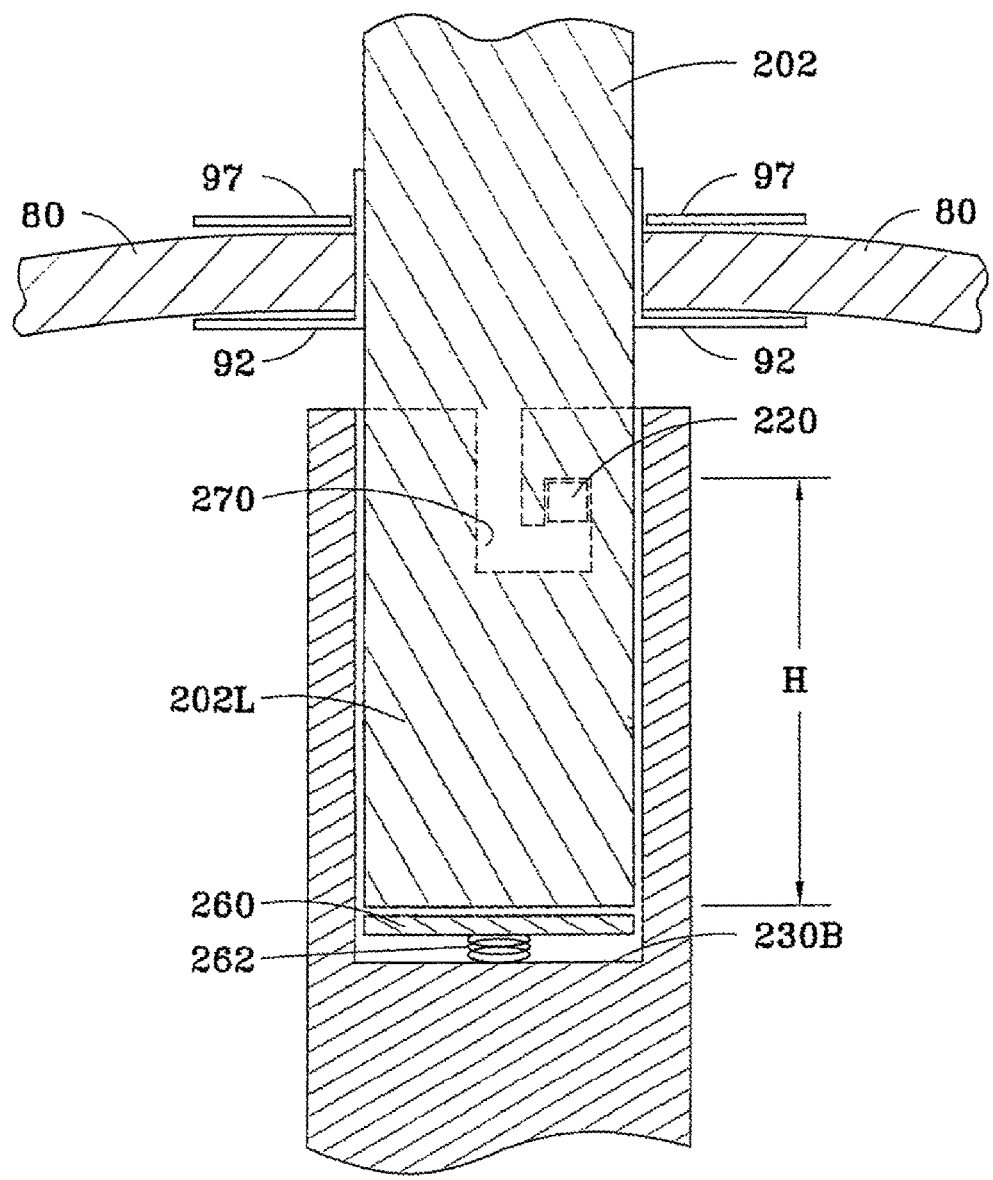
FIG. 12 is an enlarged, vertical, cross-sectional view of the lower end portion of the external turbine shaft of FIGS. 5 and 11 after installation, and showing an opening in the lid.
Figure 14:
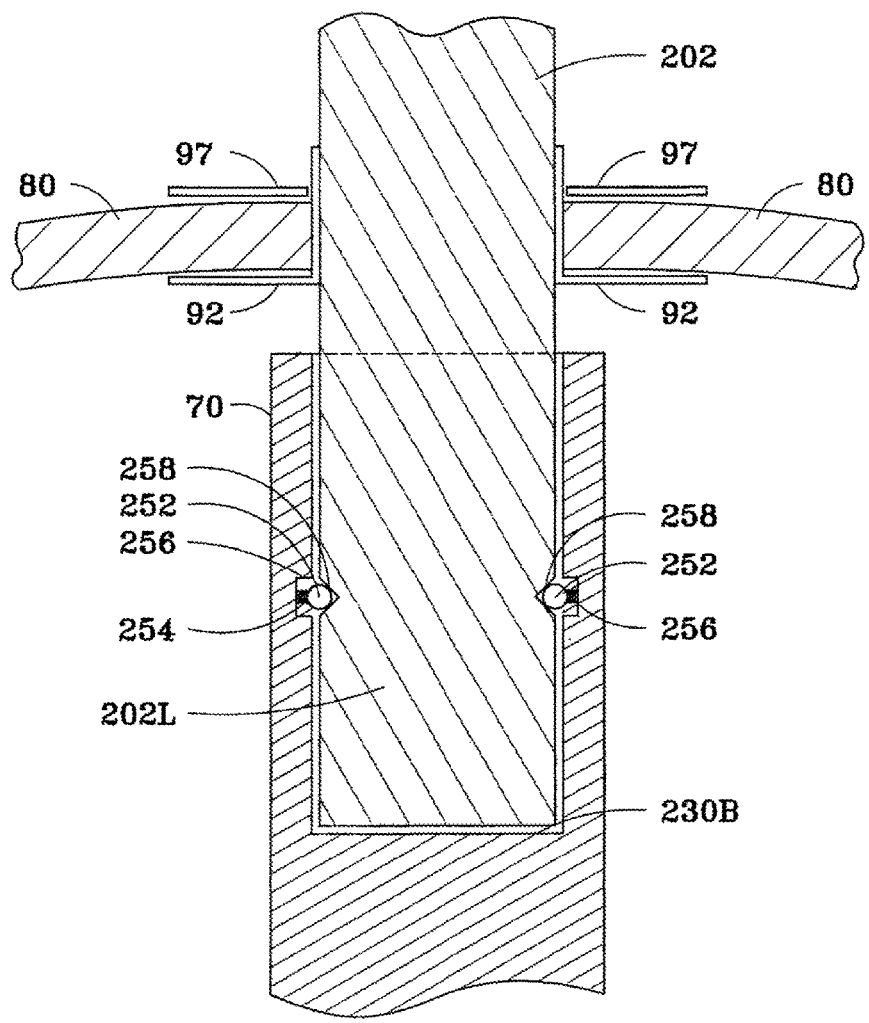
FIG. 14 is an enlarged, cross-section of the assembly of FIG. 13 showing the alternative hub shaft after installation.

Prior to installation of the internal wind turbine 10 on the roof 14 of the vehicle 12, a vertical through-hole 16 may be formed or drilled through the roof 14 as may be seen in FIGS. 6, 12, and 14, for configurations where the turbine drives generator or other components inside the vehicle 12. The internal wind turbine 10 is enclosed in a housing 20, which includes a bottom panel 22 extending longitudinally from a front end 22F to an opposite, rear end 22R, and which also extends laterally between a first side 26 and an opposite, second side 28. The bottom panel 22 may be an independent component or may also be the roof 14 of the vehicle.

For ease of installation, and improved operational efficiency and aesthetic appearance, and specifically to minimize wind resistance and noise during operation when the vehicle is being driven, when used, the bottom panel 22 is preferably dimensioned and contoured to closely overlie an exterior surface of at least a portion of the vehicle roof 14 that includes the through-hole 16. More preferably, the bottom panel 22 is formed to be adjustably conformal to the vehicle roof 14 to minimize any leading edge gaps between the bottom panel 22 and the roof 14. In other variations, the bottom panel 22 is not used, and instead the vehicle roof 14 serves as the bottom panel 22. For purposes of example, the gap between the bottom panel 22 and the leading edge and exterior surface of the roof 14 preferably should be kept to less than about 5 mm. Alternatively, no gap is present when the vehicle roof 14 is used as the bottom panel 22.

Figure 2:
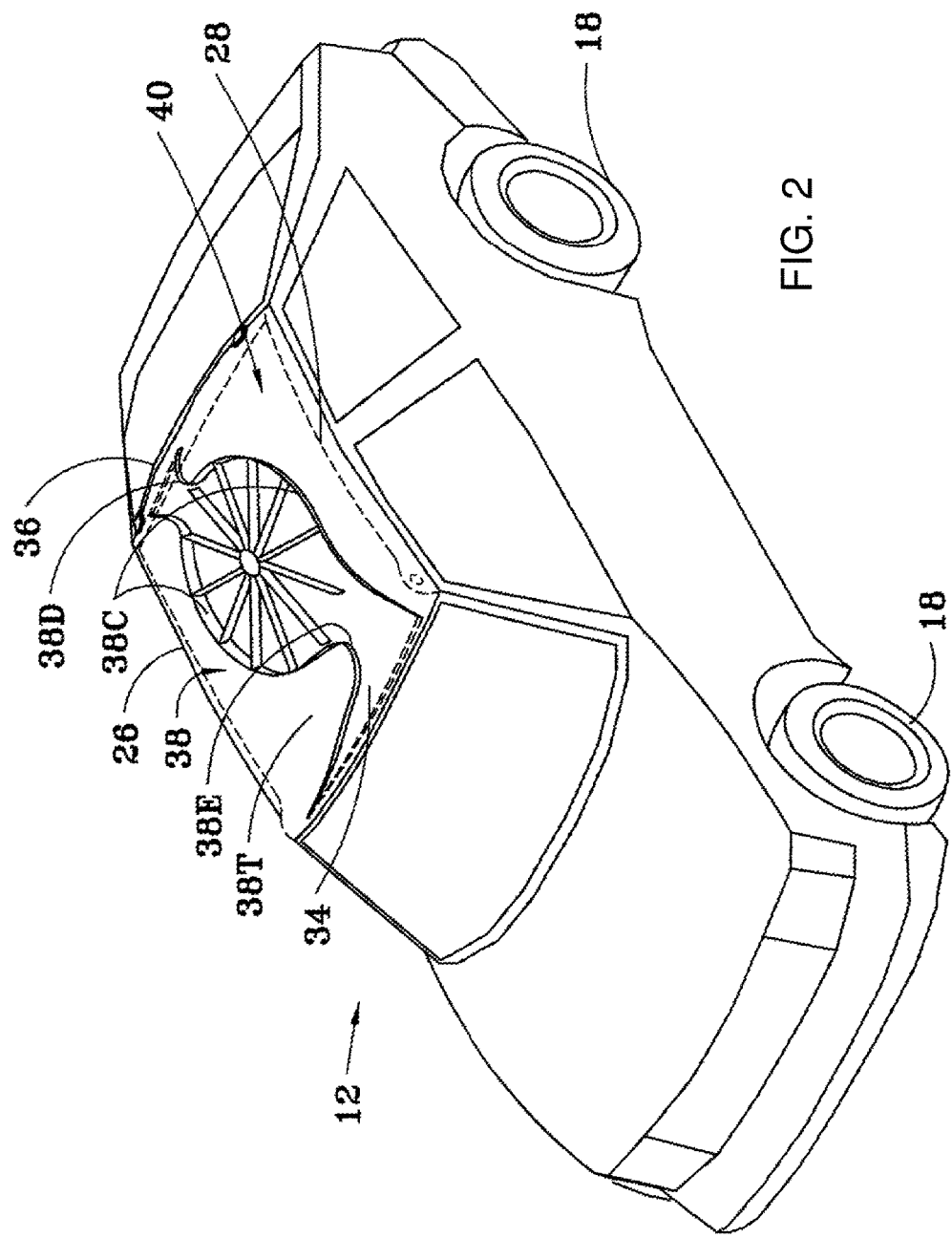
FIG. 2 a top, perspective view of the wind turbine system of FIG. 1, with a lid removed from the system for illustration purposes.

With reference also now specifically to FIGS. 2 and 6, the bottom panel 22 is depicted being formed with or the vehicle roof 14 is defined to have a centrally disposed area of generally flat, upper surface 30. For applications where the turbine 10 drives components inside the vehicle 12, the upper surface may include and define a vertically-directed, shaft opening 32 extending through the bottom panel 22 to an opposite, lower surface of the bottom panel 22, and or through the roof 14. A front end 22F of the bottom panel 22 or the vehicle roof 14 defines an air inlet opening 34, which is positioned to enable air to enter the internal wind turbine 10 while the vehicle 12 is in forward motion.

The vehicle roof 14 or the bottom panel 22 also includes an air outlet opening 36 defined by a rear end 22R of the bottom panel 22 or the vehicle roof 14, which enables air to exit the internal wind turbine 10. An air flow corridor 38 is formed about the vehicle roof or the bottom panel 22 and extends between and joins the air inlet opening 34 with the air outlet opening 36.

FIG. 2 shows the air flow 38 corridor further including an entryway portion 38E in communication with the air inlet opening 34, a discharge portion 38D in communication with the air outlet opening 36, and a central portion 38C in communication with the entryway 38E and discharge 38D portions. The entryway portion 38E is preferably contoured to channel or conduct air flowing into the inlet opening 34 toward the second side 28 of the bottom panel 22.

The central portion 38C is also contoured to conduct air from the entryway portion 38E substantially rotationally around the shaft opening 32. The central portion 38C is also defined by first and second, upstanding, semicylindrical, interior walls that are laterally and generally symmetrically spaced apart on opposite sides of the turbine shaft axis A-A.

Although the term "semicylindrical" generally refers to a bisected half of a cylinder, here it is intended to not be so limited and to instead describe an arcuate form that can be somewhat less than a full, 180° semicircular or semicylindrical arc of the noted bisected half of a cylinder. For purposes of example, the cross section of the described contoured central portion 38C contemplated a cross section having an arcuate form defining an arc anywhere in the range of about 120° to about 180°. The discharge portion 38D is similarly contoured to conduct air from the central portion 38C to the air outlet opening 36.

Accordingly, with the vehicle 12 in forward motion, air enters the internal wind turbine 10 through the air flow corridor 38 and transfers its kinetic energy to rotate a turbine blade assembly 40 about the turbine shaft axis A-A (FIGS. 6 & 7) in a counterclockwise direction as the corridor 38 is depicted in FIG. 2. The internal wind turbine 10 may be further adapted wherein the air flow corridor 38 further includes a tongue 38T (FIG. 2) that extends laterally from a first pivot mount 81 (FIG. 6) partially across and above the front end 22F of the bottom panel 22, thereby further defining the air inlet opening 34.

With this arrangement, the tongue 38T deflects the oncoming flow of air away from the first side 26 and toward the second side 28 of the bottom panel 22. This in turn further improves the directional control of the air flowing through the internal wind turbine 10, which is intended to improve the energy transfer from the moving air to the turbine blade assembly 40.

Referring now also to FIGS. 6-12, the configuration of the turbine blade assembly 40 can be understood to be disposed within the central portion 38C of the air flow corridor 38. The turbine blade assembly 40 includes a hub 42 that rotates about turbine shaft axis A-A, and which extends axially along the axis A-A between a first, lower end 42L and a second, upper end 42U thereof.

A plurality of turbine blades 44 is distributed about the periphery of the hub 42 and extend radially away from the hub 42 generally normal to the turbine shaft axis A-A. The hub 42 has a collar 41 for each blade 44, disposed within an opening in the hub 42, which collar 41 may be welded or press fit within the hub opening.

Figure 10:
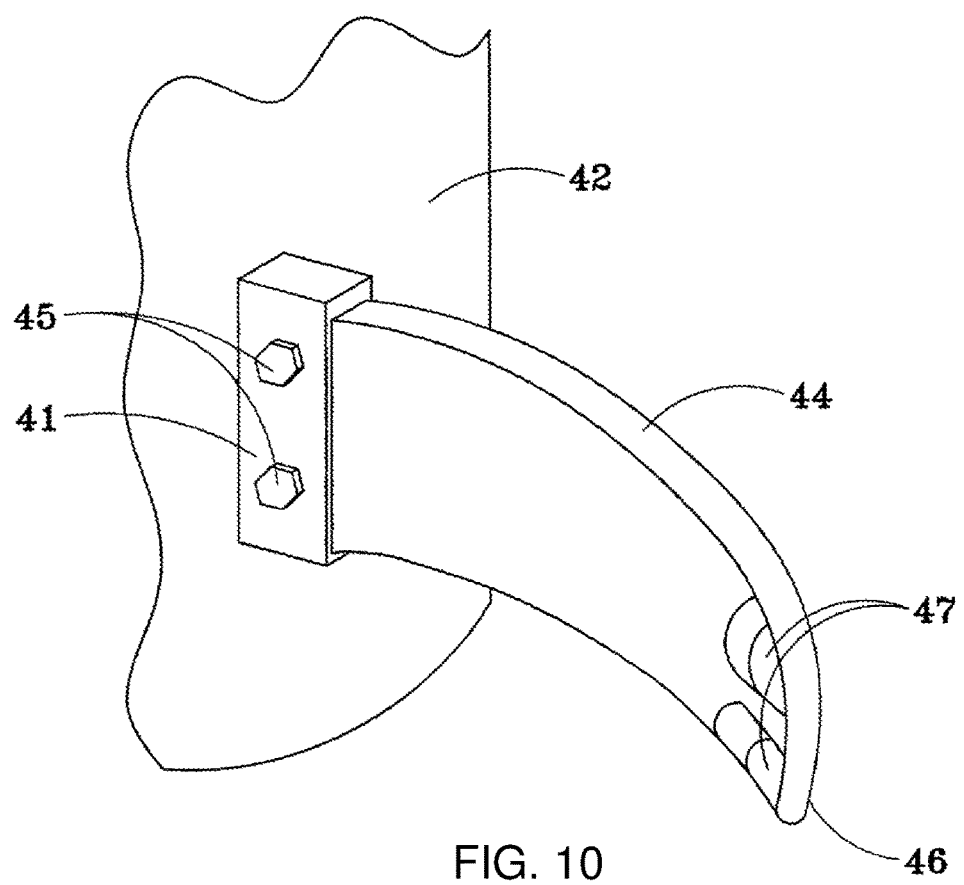
FIG. 10 is a perspective, side view of a single turbine blade of FIGS. 7, 8, and 9 with various structure removed for clarity of illustration, showing the blade inserted into the collar, and having a pair of weights attached to an upstream, concave side of a blade at the tip end thereof.

A first end of each blade 44 is attached by threaded fasteners 45 (e.g., hex-head bolts) to a collar 41 and has an opposite, tip end 46. Preferably, each blade tip 46 is weighted as, for example as shown in FIG. 10, by one or two weights, which can be beads of metal 47 welded to an upstream, concave side of the blade tip. Preferably, each blade tip includes weights amounting to approximately at least 10% the weight of the entire blade 44, the weight being selected to optimize the rotational balance and/or the angular momentum of the turbine blade assembly 40. A damaged blade 44 may be removed for replacement by loosening its threaded fasteners 45 and removing the blade from its collar 41.

Referring now to FIG. 6, the internal wind turbine 10 is further depicted to include an electric generator 48, an attachment assembly 50 for attaching the electric generator 48 anywhere about the wind turbine assembly 10, including for example: (a) within or about the air flow corridor 38, and (b) to an inside surface of the roof 14 of the vehicle 12, and means 52 (FIGS. 6 & 7, described in more detail below) for coupling a shaft 54 of the electric generator 48 to the hub 42. Although the phrase "electric generator 48" is used throughout this description, the electric generator 48 may be any one or more electricity generating devices and components, which can include without limitation and for purposes of example, one or more magneto assemblies, an alternating current (AC) alternator, a direct current generator or dynamo, and related components and combinations thereof.

The means 50 for attaching the electric generator 48 about the air flow corridor 38 and/or to the inside surface of the roof 14 can be any of various means known to persons of ordinary skill in the art of installation of motor vehicle electrical components, such as the pair of brackets 56 and the threaded fasteners 58 depicted in FIG. 6. To minimize the exterior profile of the wind turbine assembly 10 and the reduction of headroom space inside the passenger compartment of the vehicle 12, the electric generator 48 should be compact and have a pancake-style or narrow side profile. Alternatively, the electric generator 48 may be carried exterior to the vehicle and within the enclosure of internal wind turbine 10, as described in more detail elsewhere herein. The exteriorly mounted electric generator 48 arrangement eliminates the need for creating a through bore in the roof 14.

Figure 7:
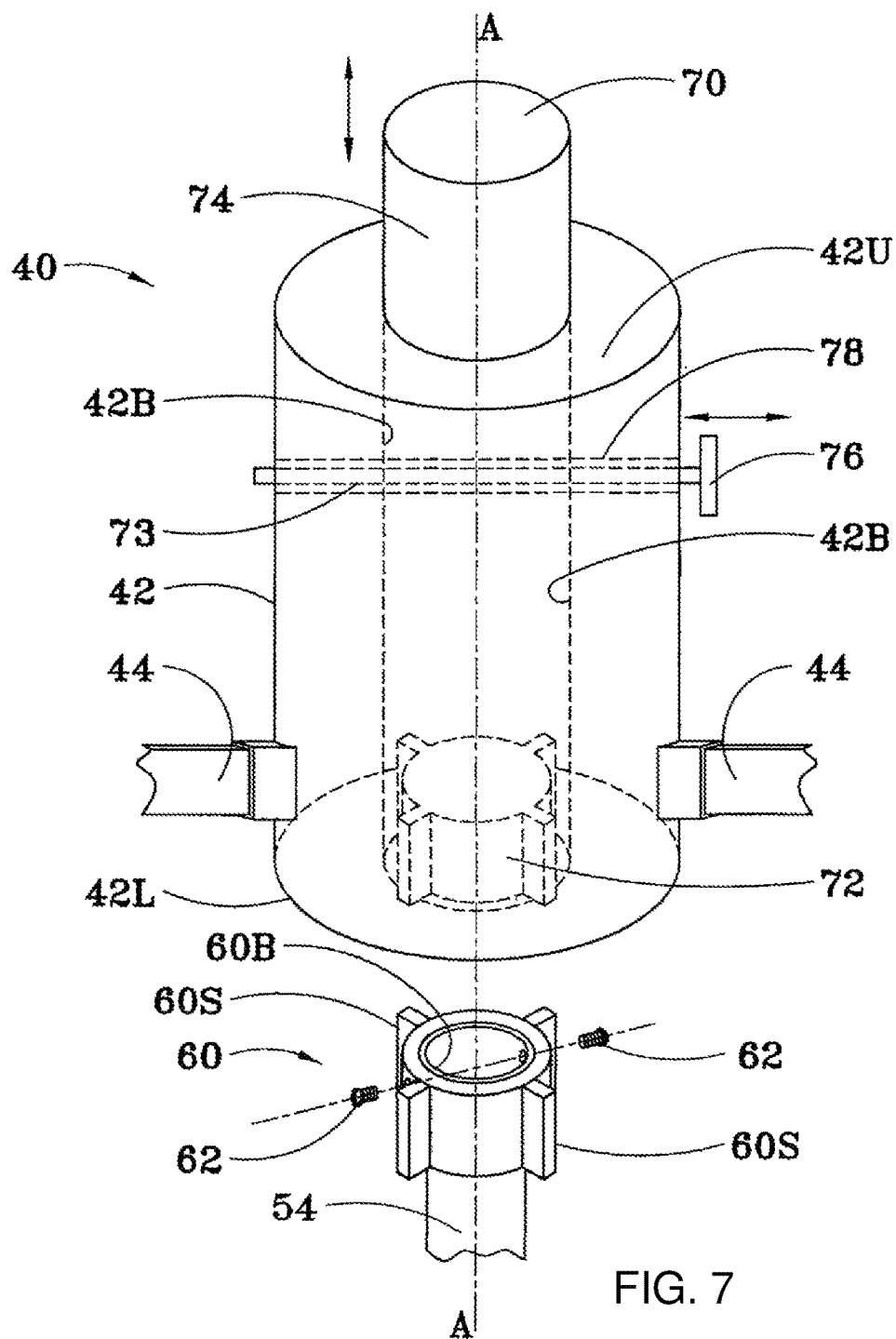
FIG. 7 is an exploded, perspective side view of the system of the preceding figures, and illustrating a turbine hub assembly and an upper end portion of an electric generator shaft having a lower splined adaptor.
Figure 8:
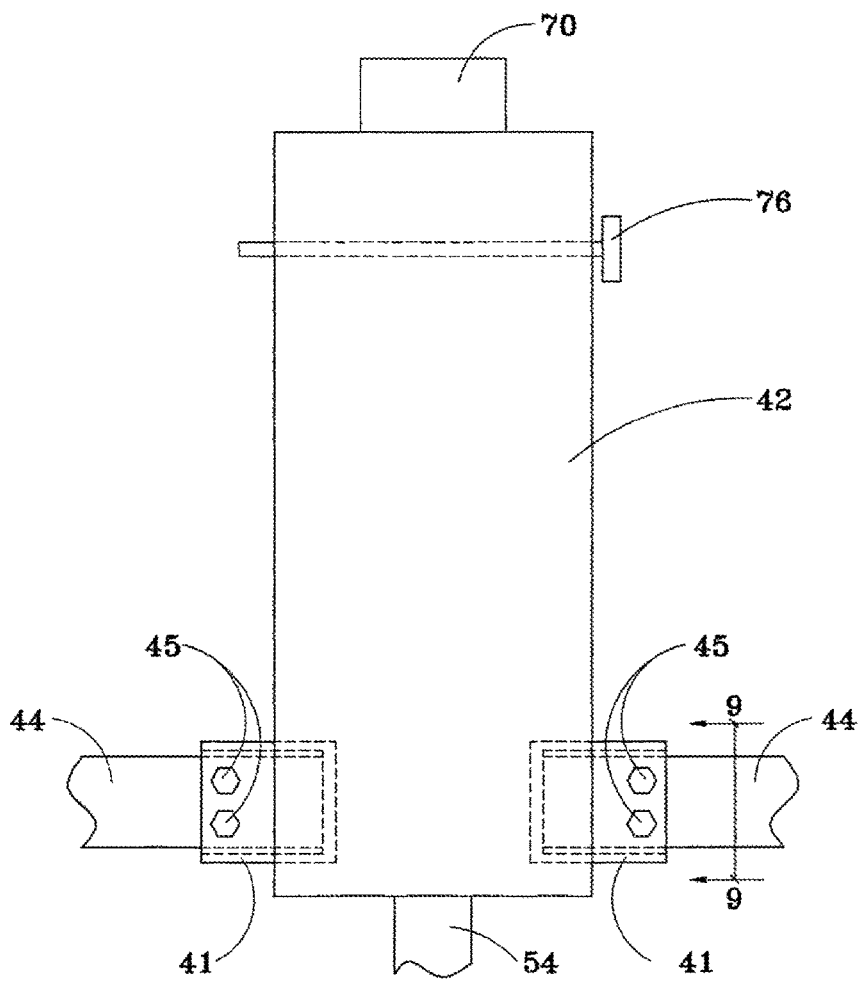
FIG. 8 is an enlarged, side elevational view of the hub assembly of FIG. 7, showing a hub shaft, which extends along the axis A-A (FIG. 7) of the hub and which protrudes above the hub. Also depicted are the turbine blades installed into radially-directed collars.
Figure 9:
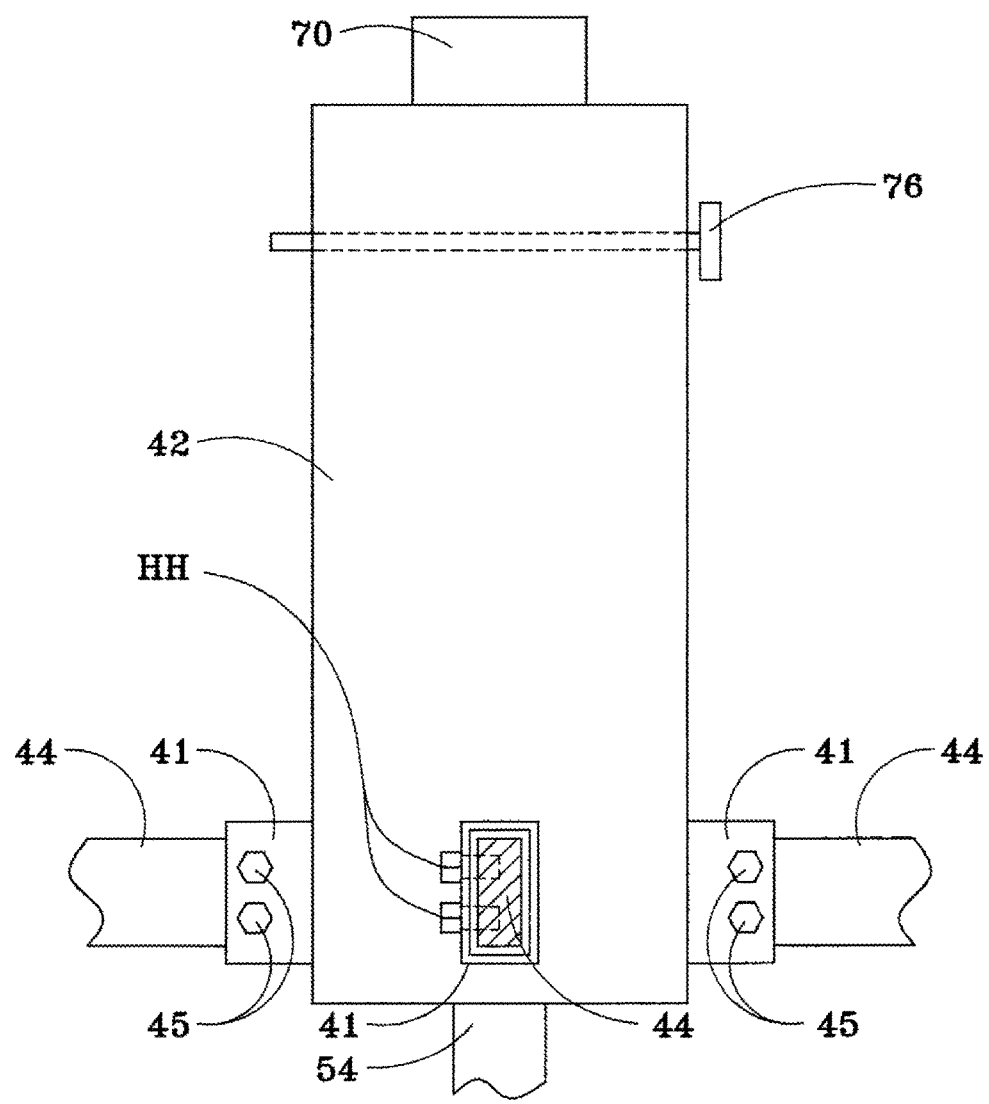
FIG. 9 is a vertical cross-section view taken along line 9-9 of FIG. 8, with various structure removed for illustration purposes.

The means 52 (FIGS. 6 & 7) for coupling the shaft 54 of the electric generator 48 to the hub 42 are preferably attached to the shaft 54 to rotate about the turbine shaft axis A-A. The means 52 includes, as illustrated in FIG. 7, an adaptor 60 that is attachable to the generator shaft 54 by, for example, set screws 62 that screw into threaded apertures in the adaptor 60.

The adaptor 60 includes a plurality of radially-directed splines or vanes 60S circumferentially spaced apart about the adaptor. A throughbore 60B is included to have a diameter dimensioned to receive the generator shaft 54. Although the adaptor 60 depicted in FIG. 7 has four splines 60S, the number of splines may also vary from one to 12 or as otherwise needed. The hub 42 has an axial throughbore 42B that extends from the lower end 42L to the upper end 42U thereof.

A hub shaft 70 having an external diameter somewhat less than the internal diameter of the throughbore 42B is slidably insertable into and out of the throughbore. Optionally, when fully inserted into the throughbore 42B of the hub 42, the hub shaft 70 may have an upper end portion 74 that protrudes above the upper end 42U of the hub 42, as depicted in FIG. 6. This protrusion is limited to prevent interference with lowering the lid 80 to a fully closed and locked position.

A lower end portion of the hub shaft 70 includes a lower recess 72 (shown as hidden lines with phantom outline in FIG. 7), which is shaped and dimensioned to receive in mating engagement the splines 60S of the adaptor 60. When the splines 60S of the adaptor 60 are inserted within the lower recess 72 of the hub shaft 70, the generator shaft 54 is coupled for co-rotation with the hub shaft 70.

A pin 76 is insertable through a horizontal aperture 78 in the hub shaft 70 as well as through a co-aligned aperture 73 in hub 42 near the upper end 42U of the hub 42. So long as the pin 76 is so inserted through both the hub 42 and the hub shaft 70, the generator shaft 54, adaptor 60, hub shaft 70 and hub 42 are mechanically coupled and will rotate as one about the turbine shaft axis A-A.

Moreover, in the event the vehicle 12 is jostled traversing uneven ground, the pin 76 prevents relative vertical movement between the hub 42 and the hub shaft 70. By raising or removing the lid 80 and withdrawing the pin 76 from the hub 42 and hub shaft 70, the hub 42 and attached blades 44 can be lifted up and away from the adaptor 60 and hub shaft 70. This configuration enables replacement of a damaged blade 44 and/or cleaning the housing 20 of accumulated dirt and debris.

Figure 3:
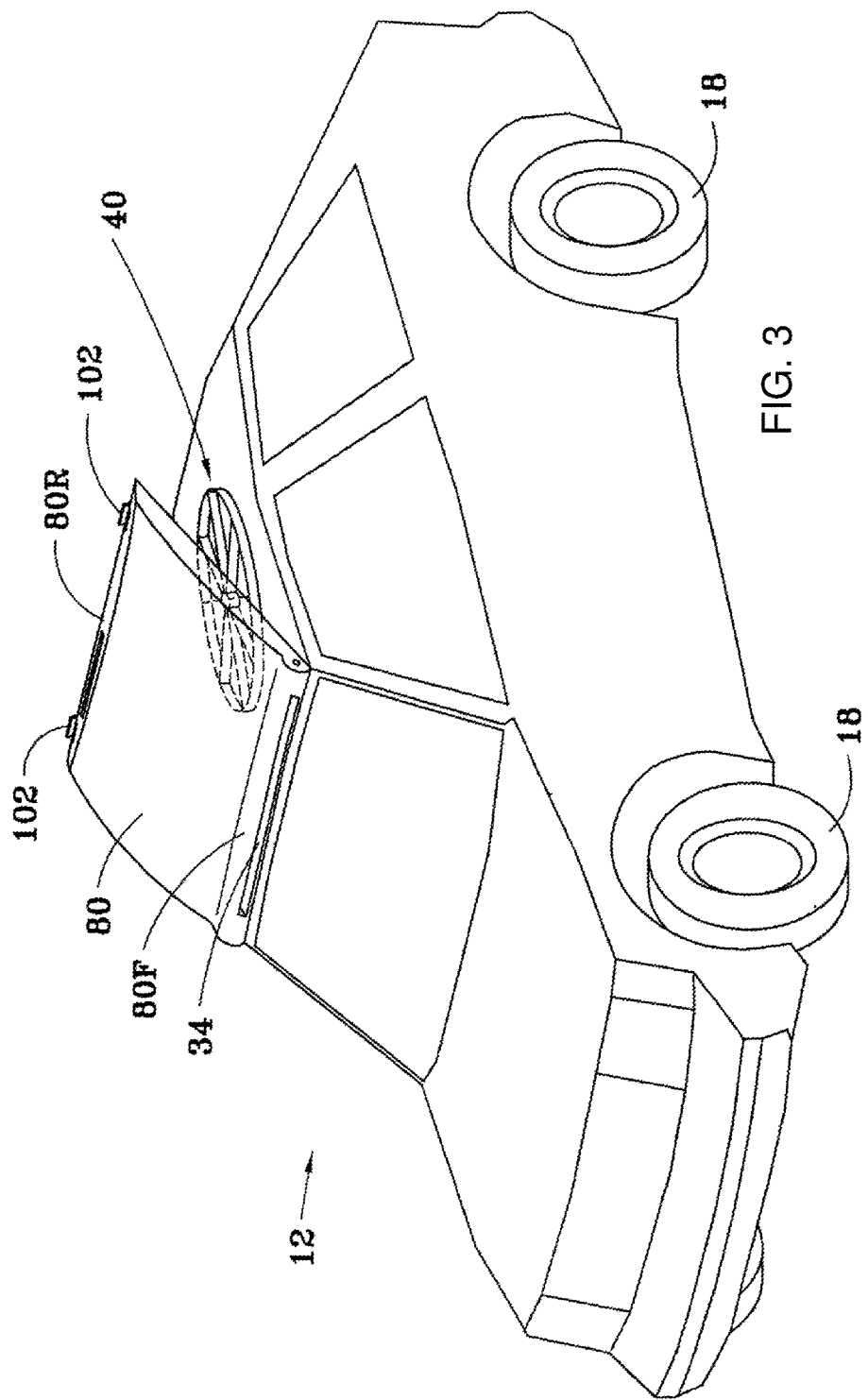
FIG. 3 is a front, perspective view of the wind turbine system of FIG. 1 showing the lid being hinged about the system, and being positioned partially raised to show blades of a turbine blade assembly.
Figure 4:
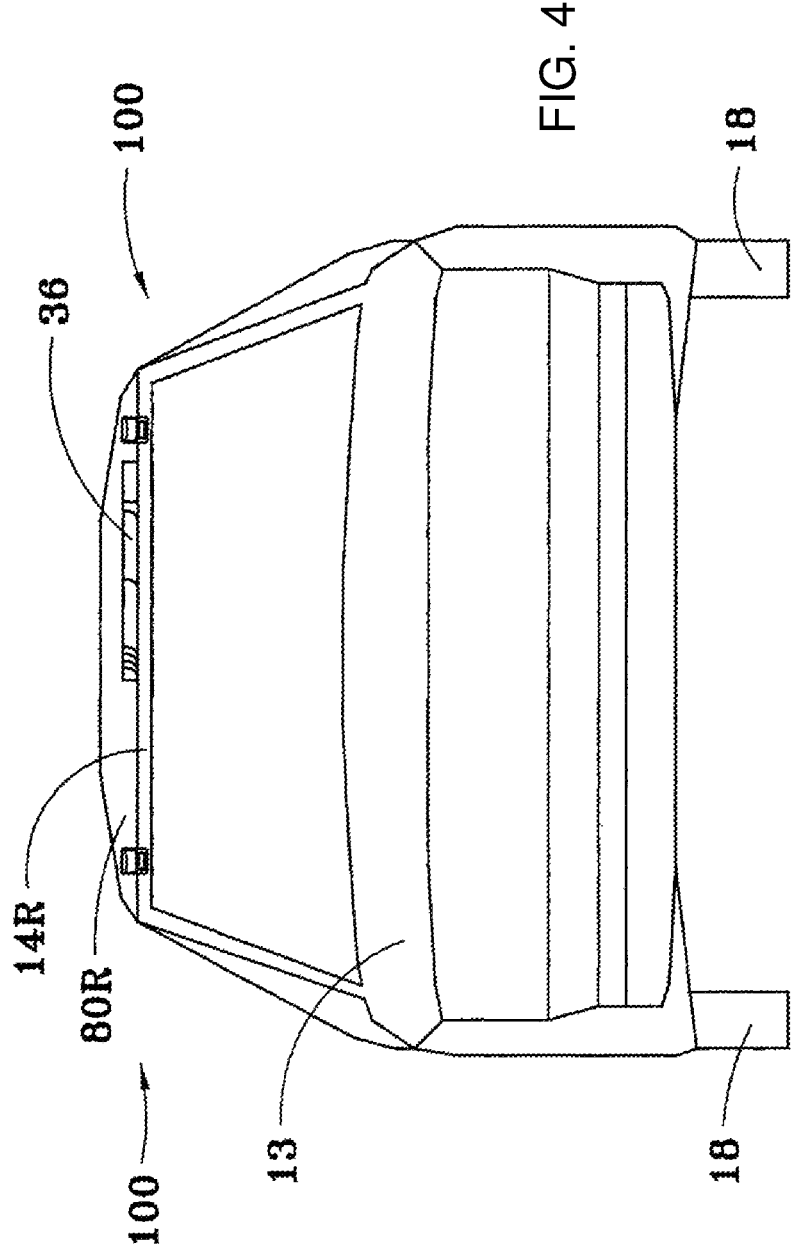
FIG. 4 is a rear, elevational view of the system of FIG. 1 with the lid in closed a position.

To minimize the friction of rotation of the turbine blade assembly 40 and to support the axial load thereof, a concentric pair of ball bearing races 33 containing a plurality of ball bearings (not shown) are interposed between the lower end 42L of the hub 42 and the upper surface 30 of the bottom plate 22. Being centered on the turbine shaft axis A-A, the ball bearing races 33 are attached to the upper surface 30. The lower end 42L of the hub 42 rests on the ball bearings 33, as shown in FIG. 6. The internal wind turbine 10 further includes a lid 80 that extends longitudinally from a front end 80F to an opposite rear end 80R. The lid 80 is shaped and dimensioned to cover the entirety of the housing 20. The housing 20 has a pair of laterally spaced-apart, upstanding, apertured, pivot mounts 81 attached to the bottom panel 22, at or near a front end 22F of the panel. A front end 80F of the lid 80 has a laterally-directed, pin-receiving aperture 85, which is pivotally attached to the pivot mounts 81 by a pair of pivot pins 83 that insert into the apertures. This enables the lid to pivot between a lowered, housing-covering position (FIG. 1) and a raised, open position (FIG. 3).

To facilitate repair and maintenance of the internal wind turbine 10, the pivot pins 83 can be withdrawn from the pivot mounts 81, which permits removing the lid 80 entirely from the housing 20. The lid 80 has an opening 82 aligned with the turbine shaft axis A-A when the lid is in the lowered position. In the lowered position, the lid 80, in combination with the corridor 38, bottom panel 22 and seal means 90, forms a closed compartment surrounding the turbine blade assembly 40.

Referring to FIG. 6, the seal means 90 for sealing the housing 20 against moisture and air leaks includes hub grommet 92 such as a ring washer. The grommet 92 is joined to an upstanding, hollow, cylindrical, neck or tube that extends up through the opening 82 in the lid 80. The neck portion of the hub grommet 92 extends above the upper surface of the lid 80 by, for example, 3 to 10 mm. A removable cap 96 is included and has a downward-directed hollow, cylindrical neck or tube mounts on that upper, extended neck portion of the hub grommet 92.

Preferably, the seal means 90 further includes an annular washer 97 that also mounts on the neck portion of the hub grommet 92 between the upper surface of the lid 80 and the cap 96. The seal means 90 will ordinarily remain in place attached to the lid 80 while the lid is being pivoted up and down between its lowered and raised positions.

When the vehicle 12 is parked with the lid in lowered position, and it is desired to use wind energy to charge the electric storage battery, the cap 96 is removed and an external shaft 202 of an external, second wind turbine 200 is inserted through the lid opening 82 and hub grommet 92. The lid opening 82 and the hub grommet 92 are dimensioned to receive the external shaft 202. The hub grommet 92, cap 96 and annular washer 97 may preferably be formed from butyl rubber, pliable silicone materials, or any other suitably flexible material.

The internal wind turbine 10 also has lid locking means, denoted generally by the numeral 100, comprising a laterally spaced apart pair of upper half clasps 102 that attach by hinges to the rear end 80R of the lid 80 and a mating, laterally spaced apart pair of half clasps 104 that attach to a rear portion of the vehicle 12 by threaded fasteners 106, for example, to a rear portion 14R of the roof 14 thereof. Any of a variety of kinds of mating pairs of half clasps can be used for this purpose, for example, the mating pairs of half clasps on steamer trunks as well the mating pairs of half clasps on mechanics' tool boxes.

Figure 5:
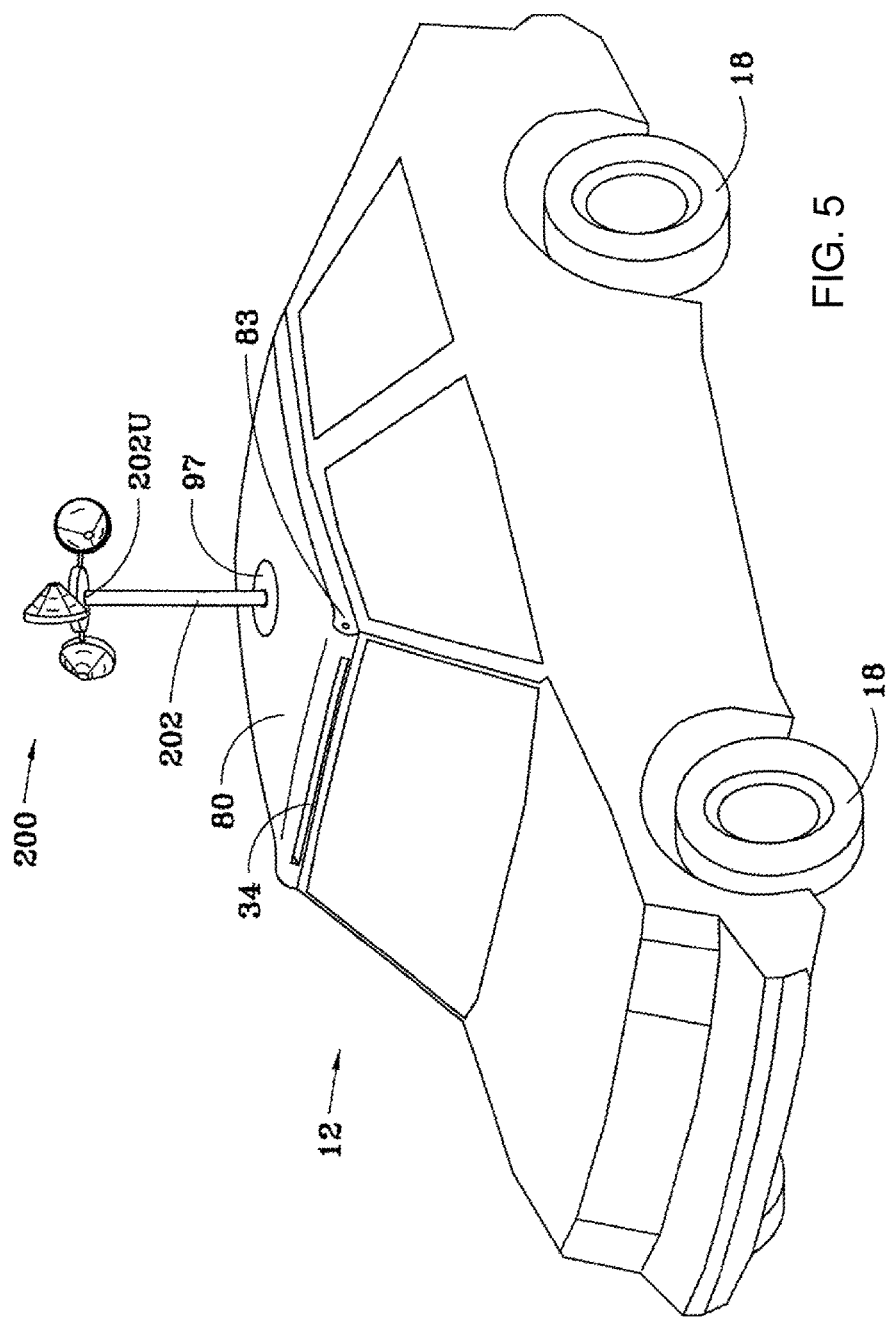
FIG. 5 is a front, perspective view thereof of the system of the preceding figures, with an external wind turbine mounted to the vehicle for charging an electric storage battery of the system while the vehicle is parked.
Figure 15:
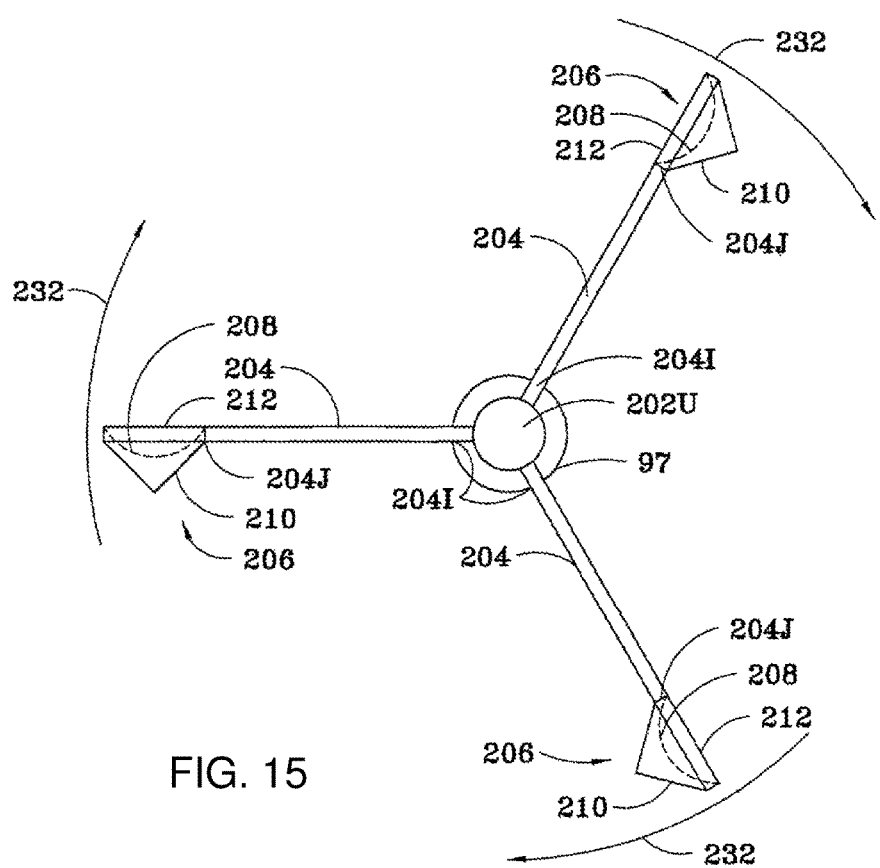
FIG. 15 is an enlarged, top plan view with various structure removed for clarity, and showing the external wind turbine of FIGS. 5, 11, 12, 13, & 14 during operation.

For converting ambient wind energy into electrical current to charge the electric storage battery of a hybrid and/or all-electric vehicle 12 while the vehicle is parked, the invention further includes an external, second wind turbine 200 (FIGS. 5 & 15). The external, second wind turbine 200 may be stored in the trunk 13 or other secure location within the vehicle 12 until needed.

As may be seen in FIGS. 5 and 15, the external wind turbine 200 includes an external shaft 202 that extends from an upper end 202U to an opposite, lower end 202L along an external shaft rotation axis. The external wind turbine 200 further includes a plurality of radially-directed arms 204 circumferentially spaced apart around the upper end 202U of the external shaft 202. Each arm 204 has an inner end 204I attached to the external shaft 202 and an opposite, outer end 204J. For catching ambient wind currents, a cup 206 is attached to an outer end 204J of each arm 204.

Each cup 206 has a concave inner surface 208 (shown in FIG. 5, and as dashed lines in FIG. 15) and a convex outer surface 210 that meet at the opening 212 of the cup. The opening 212 of each cup 206 is directed essentially along the tangent to the rotational path (arrows, 232) of the cups about an external shaft axis (co-linear with turbine shaft axis A-A), and all the cups are oriented in the same rotational sense about the external shaft axis, as illustrated, for example, in FIGS. 5 & 15.

The number of arms and cups is variable, but three of each, which may be spaced apart at 120-degree intervals about the external shaft axis is a preferred number. Thus, the external wind turbine 200 resembles a cup anemometer in appearance and mechanical function. Cups 206 are used in the external wind turbine instead of turbine blades as a better way to harness the energy in ambient, variable, low velocity winds while the vehicle 12 is parked.

The external wind turbine 200 includes means to couple a lower end portion 202L of the external shaft 202 to the hub 42 while maintaining the external shaft in coaxial alignment with the turbine shaft axis A-A. To that end, an upper end portion 70U of the hub shaft 70 has a recess wall 230W that defines a cylindrical recess 230, which extends downward along the turbine shaft axis A-A from the upper end of the hub shaft to a bottom end 230B of the recess.

The recess 230 is shaped and dimensioned to receive the cylindrical, lower end portion 202L of the external shaft 202 when the shaft is inserted through the opening 82 of the lid 80. In a first embodiment of the invention, the recess wall 230W has a pair of grooved pathways 270 disposed at diametrically opposite locations on the recess wall.

Figure 11:
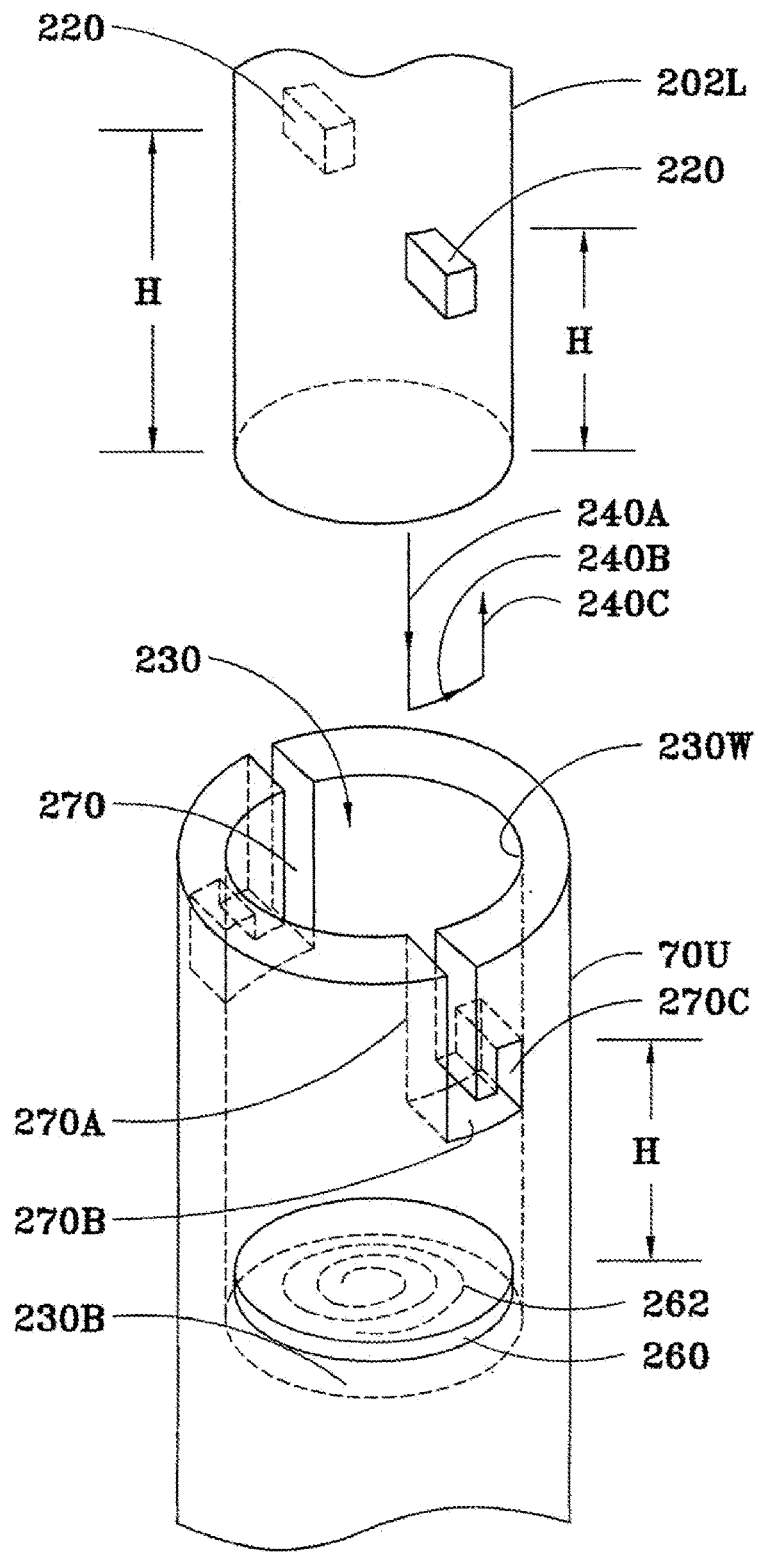
FIG. 11 is an enlarged, perspective, side view of the hub shaft of FIGS. 6, 7, 8, and 9, wherein an upper end portion of the hub shaft has a cylindrical, upper recess dimensioned to receive a lower end portion of the external shaft of the external wind turbine of FIG. 5 in position prior to installation.

As depicted in FIGS. 11 and 12, each pathway 270 includes a first leg 270A that extends from the upper end of the hub shaft 70 toward the bottom end 230B of the recess 230. A second leg 270B is also included that extends through a circumferential arc normal to the turbine shaft axis A-A. Next, an included third leg 270C extends reversely part way back toward the upper end of the hub shaft 70, thereby forming a blind end of the pathway 270.

Attached to the lower end portion 202L of the external shaft 202 are a pair of oppositely-disposed, oppositely-directed ears 220. The ears 220 are shaped and dimensioned to be received in sliding engagement within the grooved pathways 270 when the lower end portion 202L of the external shaft is inserted into the recess 230.

Preferably, a lower end portion 202L of the external shaft 202 is coupled to the hub 42 and further includes a disk-shaped, buffer plate 260 disposed near the bottom end 230B of the recess 230. The diameter of the buffer plate 260 is slightly less than the internal diameter of the recess 230 so that the buffer plate 260 can slide axially up and down along the recess wall 230W. A spring 262 (e.g., a coil spring) urges the buffer plate 260 axially upwards towards the pathways 270, and is positioned between the buffer plate 260 and the recess bottom 230B.

To couple the external shaft 202 to the hub shaft 70, the lower end portion 202L of the external shaft is inserted through the opening 82 of lowered lid 80. Next, the ears 220 are aligned with the first legs 270A of the pathways 270. The shaft 202 is then pressed down against the buffer plate 260 as the ears slide down along the first legs 270A (arrow 240A), thereby compressing the spring 262.

The external shaft 202 is then rotated about the turbine shaft axis A-A to slide the ears 220 through the circumferential legs 270B (arrow 240B). Lastly, the external shaft 202 is retracted axially to permit the ears 220 to slide along legs 270C (arrow 240C) and lodge in the blind ends of the pathways 270. The spring 262 helps to keep the ears 220 firmly within the blind ends of the pathways 270.

For this to work properly, the distance H between the ears 220 and the lower end of the external shaft 202 needs to be about equal to the distance between the buffer plate 260 and the blind ends of the pathways 270 when the external shaft is coupled to the hub shaft. In other words, when the spring 262 is at least partially decompressed to urge the buffer plate 260 against the ears 220, which urges and lodges the ears 220 into the blind ends of the pathways 270. To uncouple the external shaft 202 from the hub shaft 70, this process is simply reversed.

Figure 13:
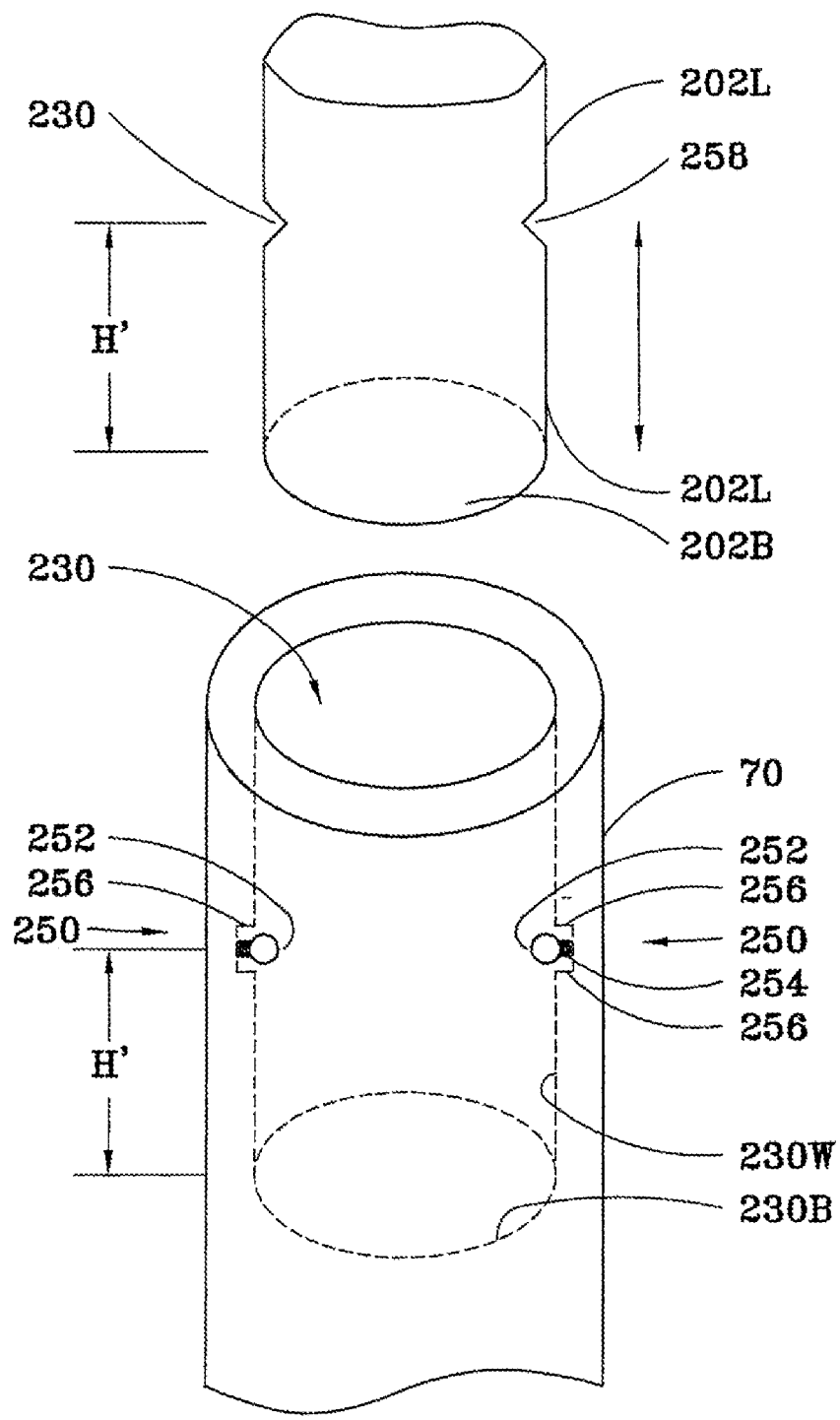
FIG. 13 is an enlarged, perspective, side view of an alternative hub shaft of FIGS. 5, 11, & 12 shown in position prior to installation.

In a second, alternative arrangement illustrated in FIGS. 13 and 14, the hub shaft 70 likewise has an axially-directed, cylindrical recess 230 that extends from the upper end of the hub shaft to a bottom end 2308 of the recess. The recess is dimensioned to receive in surrounding engagement a lower end portion 202L of the external shaft 202.

As depicted in FIGS. 13 and 14, an oppositely-disposed pair of ball-and-spring assemblies, denoted generally by the numeral 250, is attached to the recess wall 230W. Each such assembly 250 comprises a spring 254 having a first end attached to an alcove 256 in the recess wall 230W and an opposite end attached to a ball 252. For each assembly 250, when its spring 254 is uncompressed, its ball 252 extends at least part way out of the alcove 256 and partially occludes the recess 230.

A lower end portion 202L of the external shaft 202 has a pair of oppositely-disposed, notched indents 258. Each indent 258 comprises an upper, inwardly beveled edge surface that is joined to a lower, outwardly beveled edge surface. The distance H' between the bottom 202B of the external shaft 202 and the indents 258 corresponds to the distance H' between the recess bottom 230B and the ball-and-spring assemblies 250.

Accordingly, to couple the external shaft 202 to the hub shaft 70, with the vehicle 12 parked and the lid 80 in lowered position, the cap 96 is removed and the lower end portion 202L of the external shaft is passed through the lid opening 82 and into the hub shaft recess 230. Initially, downward movement of the external shaft 202 forces the balls 252 into the alcoves 256 and the springs 254 are compressed; but, upon arrival of the indents 258 at the alcoves 256, the balls, under the urging of the springs 254, move into the indents.

Thus, to operate properly, the alcoves 256 need to be large enough to accommodate both the balls 252 and the springs 254. To uncouple the external shaft 202 from the hub shaft 70, the external shaft is grasped and yanked upward, thereby sliding the lower beveled surfaces of the indents 258 past the balls 252, forcing the balls back into the alcoves until the external shaft has been fully raised above them, after which the balls once again extend from the alcoves out into the recess. Although only a single pair of indents 258 and a single pair of ball-and-spring assemblies 250 have been illustrated and described, additional pairs of each for coupling the external shaft 202 to the hub shaft 70 are within the scope and intent of the present invention.

Thus, it should be evident that a system for harnessing wind energy to charge an electric storage battery of any type of vehicle, including an all-electric motor vehicle has been shown and described in sufficient detail to enable one of ordinary skill in the art to practice the invention. Although not illustrated and described above, it will be understood that practicing the invention requires routing electrical cables from electrical output terminals of the generator 48 through the vehicle 12 to its electrical storage battery and charging system.

Figure 17:
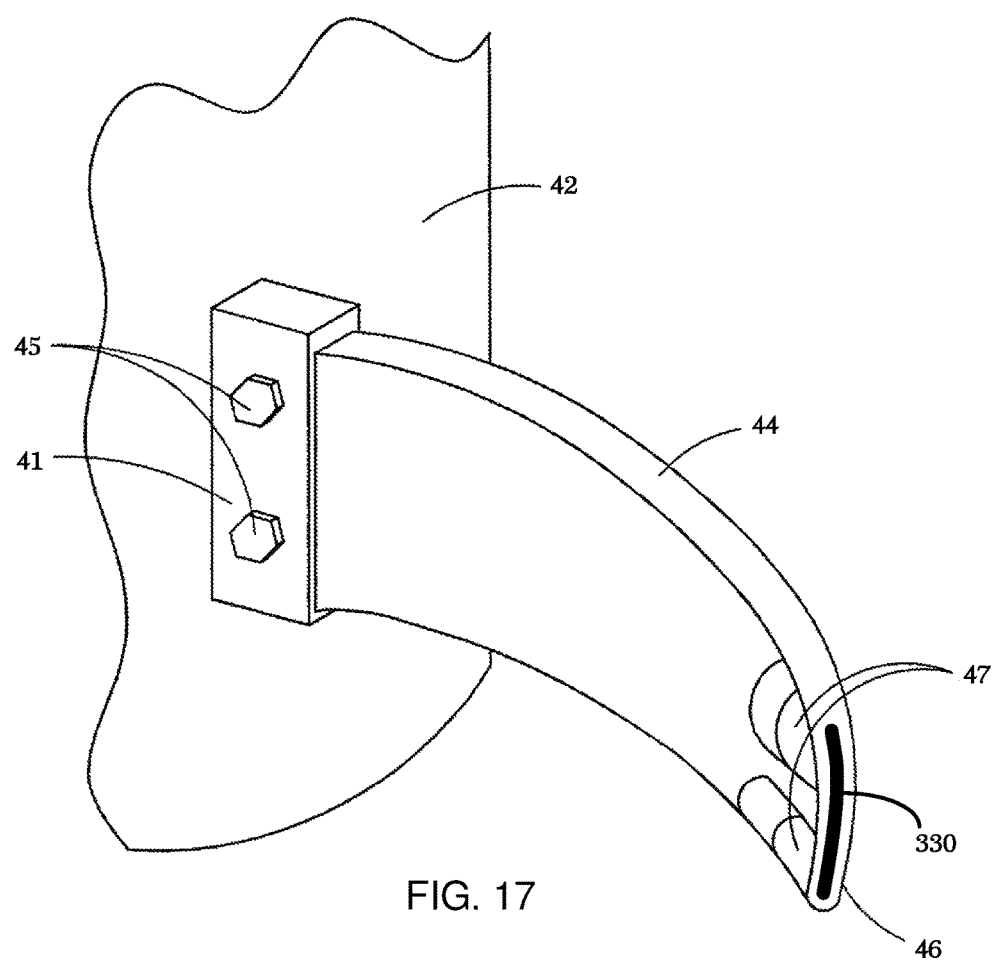
FIG. 17 is a side view of a single turbine blade of FIGS. 7, 8, 9, and 10 with various additional elements depicted for further illustration.

With continuing reference to the various figures, and now also specifically to FIGS. 16 and 17, other types of electric generators are depicted in other configurations to include one or more or at least one alternator, dynamo, and or magneto arranged about the wind turbine 10. In FIG. 16, a generator 300 is shown as a pancake style or thin profile generator or alternator that is positioned as part of and or within the hub 42. In this variation, the generator 300 is part of and or coupled to the hub 42 and may include gearing mechanisms to adjust the rotational speed of the generator 300 to accommodate various rotational speeds of the coupled turbine assembly 40 of the internal wind turbine 10, as well as the external turbine 200.

FIG. 16 also depicts magnetos and or magneto assemblies 310 arranged about the central portion 38C in close proximity to the interiorly rotatable blade tips 46 of the turbine blades 44. With reference now also to FIG. 17, one or more or each of the blade tips 46 may further modified to include magnetic elements 320 that generate a dynamic magnetic flux relative to the magnetos or magneto assemblies 310 during rotation of the blade tips 46. In further alternative configurations, the beads of metal 47 may be replaced with and or incorporate magnetic elements 330. In variations of the magnetic elements 320, double pole magnets may be utilized wherein a leading edge and a trailing edge of the magnetic elements 320 are opposite poles.

In another arrangement, one blade tip 46 may have a single pole magnetic element 320 and a subsequent or trailing blade tip 46 that follows during rotation may have a magnetic element 320 of an opposite pole, to establish a pattern of alternating opposite poles from one blade tip 46 to the next. The pattern of alternating pole magnetic elements 320 in the blade tips 46 may be, for purposes of illustration, every other blade tip 46, or may skip one or more blade tips such as every second or third blade tip 46 and so on. The pattern may be optimized according to the selected size of the internal wind turbine 10 and the blades 44, and the selected performance of the magnetos and or magneto assemblies 310.

During rotation of the blade tips 46 in any of these configurations of single, double, and alternating pole magnetic elements 320 in the blade tips, the changing magnetic flux fields enable operation of the magnetos or magnetos assemblies 310. The various arrangements of the generator 300 may include one or more or all such contemplated along or in combinations wherein the generator, alternator, and or magneto and magneto assemblies can be used to generator generate power during rotation of the internal and external wind turbines 10, 200.

Since various modifications in detail, materials, arrangements of parts, and equivalents thereof, are within the spirit of the invention herein disclosed and described, the scope of the invention should be limited solely by the scope of the appended patent claims.

I claim:

1. A system for charging an electric storage battery of a motor vehicle, comprising:
   an internal wind turbine mountable to the roof of the vehicle and contained within a housing formed from a closeable lid and at least one of (a) a bottom panel and (b) a roof of a motor vehicle;
   an air flow corridor formed within the housing to communicate air between an air inlet opening in the front of the housing, through a central portion, and an air outlet opening in the rear of the housing, the air flow corridor having an entryway portion in communication with the air inlet opening, wherein the entryway portion is contoured to conduct air entering the inlet opening toward the central portion which is further contoured to conduct air rotationally around the internal wind turbine;
   a turbine blade assembly having turbine blades with weighted tips, the assembly disposed within the central portion of the air corridor and operative to rotate in response to air moving through the central portion;
   an electric generator coupled to the turbine blade assembly to generate electricity during rotation, the electric generator selected from one or more of: (a) a magneto assembly, (b) an alternator, and a dynamo;
   the turbine blade assembly including a hub that houses the electric generator that includes at least one of the alternator and dynamo, and which (a) extends axially along a turbine shaft axis from a first, lower end to a second, upper end thereof and (b) is rotatable about the axis; and the turbine blades being a plurality of turbine blades distributed about the periphery of the hub and extending radially away from the hub substantially normal to the axis, wherein each blade of the plurality has a weighted, blade tip; and wherein the electric generator is the one or more magneto assemblies each having an induction coil and core incorporated on interior walls of the central portion and one or more permanent magnetic portions arranged on the weighted, blade tips to move proximate the induction coil and core during rotation of the blade tips.

2. The system according to claim 1, and further comprising:

the air flow corridor being attached to one of the roof and the bottom panel and having a discharge portion in communication with the air outlet opening, the entryway and discharge portions also in communication through the central portion.

3. The system of claim 1, wherein each respective blade tip comprises approximately at least 10% of the entire weight of each blade.

4. The system of claim 1, wherein each blade comprises metal and the weighted, blade tip thereof comprises a metal bead welded to a tip end of the blade.

5. The system according to claim 1, and further comprising:

the lid extending longitudinally from a front end to an opposite rear end;

the front end of the lid pivotally attached to a front portion of the housing and being pivotable between lowered and raised positions;

wherein when in the lowered position the lid in combination with the corridor and bottom panel, forms a closed compartment substantially surrounding the turbine blade assembly; and locking means attachable to a rear end of the lid for securing the lid in the lowered position and releasing the lid for repositioning to the raised position.

6. The system according to claim 1, and further comprising:

the air flow corridor being attached to the bottom panel and the discharge portion being contoured to conduct air within the central portion to the air outlet opening.

7. The system of claim 1, wherein the central portion of the air flow corridor includes first and second, upstanding, semicylindrical, interior walls that are laterally and substantially symmetrically spaced apart on opposite sides of the turbine shaft axis.

8. The system of claim 1, wherein the air flow corridor further includes a tongue extending laterally from and further defining the air inlet opening to deflect air into rotational motion about the wind turbine assembly.

9. An electric storage battery charging system for a motor vehicle, comprising:

an internal wind turbine mountable to a roof of the vehicle and contained within a housing formed from a closeable lid and bottom panel, wherein the bottom panel is releasably attachable to a roof of the motor vehicle;

an air flow corridor formed within the housing to communicate air between an air inlet opening in the front of the housing and an air outlet opening in the rear of the housing, the air flow corridor having an entryway portion in communication with the air inlet opening, wherein the entryway portion is contoured to conduct air entering the inlet opening toward a central portion that is further contoured to conduct air rotationally around the internal wind turbine;

a turbine blade assembly forming the internal wind turbine and having turbine blades with weighted tips, the assembly disposed within a central portion of the air corridor and operative to rotate in response to air moving through the central portion;

wherein the lid in combination with the corridor and bottom panel forms a closed compartment substantially surrounding the turbine blade assembly; and an electric generator coupled to the turbine blade assembly to generate electricity during rotation, the electric generator selected from one or more of: (a) a magneto assembly, (b) an alternator, and a dynamo; and the turbine blade assembly including a hub that houses the electric generator being at least one of the alternator and dynamo, and which extends axially along a turbine shaft axis from a first, lower end to a second, upper end thereof and is rotatable about the axis;

the turbine blades being a plurality of turbine blades distributed about the periphery of the hub and extending radially away from the hub substantially normal to the axis; and wherein the electric generator also includes the one or more magneto assemblies each having an induction coil and core incorporated on interior walls of the central portion and one or more permanent magnetic portions arranged on the weighted, blade tips to move proximate the induction coil and core during rotation of the blade tips.

10. The system of claim 9, and further comprising:

the turbine blade assembly including a hub rotatable about a turbine shaft axis and extending axially there along from a first, lower end to a second, upper end;

the lid including an opening aligned with the turbine shaft axis; and an external, second wind turbine having an external shaft receivable through the lid opening and to be coupled to the second, upper end.

11. The system of claim 10, and further comprising:

a plurality of radially-directed arms circumferentially spaced apart around an upper portion of the external shaft, each arm mounting a substantially concave cup.

12. The system of claim 10, and further comprising:

the second, upper end defining a recess wall defining a cylindrical recess sized to receive the external shaft.

13. The system of claim 12, and further comprising:

the recess wall formed with a pair of grooved pathways disposed at diametrically opposite locations on the recess wall, and each pathway including first, second, and third legs, each leg extending in different directions;

the external shaft having a lower end portion carrying a pair of oppositely-disposed, oppositely-directed ears, each ear being shaped and dimensioned to be received in sliding engagement within the grooved pathways; and whereby the external shaft is engageably and releasably received within the second, upper end by being insertable and rotatable whereby the ears are moved within and about the differently directed grooved pathways.

* * * * *